United States Patent
Jones

(10) Patent No.: US 7,965,863 B2
(45) Date of Patent: Jun. 21, 2011

(54) DIGITAL WATERMARKS AS A GATEWAY AND CONTROL MECHANISM

(75) Inventor: Kevin C. Jones, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 469 days.

(21) Appl. No.: 11/943,361

(22) Filed: Nov. 20, 2007

(65) Prior Publication Data

US 2008/0082618 A1    Apr. 3, 2008

Related U.S. Application Data

(63) Continuation of application No. 09/784,391, filed on Feb. 15, 2001, now Pat. No. 7,298,864.

(60) Provisional application No. 60/183,681, filed on Feb. 19, 2000.

(51) Int. Cl.
    *G06K 9/00* (2006.01)

(52) U.S. Cl. ......... 382/100; 705/62; 713/176; 358/3.28; 283/113

(58) Field of Classification Search .................. 382/100; 358/3.28; 705/62; 283/113; 713/176
    See application file for complete search history.

(56) References Cited

U.S. PATENT DOCUMENTS

| | | |
|---|---|---|
| 5,710,834 A | 1/1998 | Rhoads |
| 5,822,436 A | 10/1998 | Rhoads |
| 5,832,119 A | 11/1998 | Rhoads |
| 5,838,458 A | 11/1998 | Tsai |
| 5,841,886 A | 11/1998 | Rhoads |
| 5,841,978 A | 11/1998 | Rhoads |
| 5,862,260 A * | 1/1999 | Rhoads ............... 382/232 |
| 5,943,422 A | 8/1999 | Van Wie et al. |
| 5,956,716 A | 9/1999 | Kenner et al. |
| 5,958,005 A * | 9/1999 | Thorne et al. ......... 709/202 |
| 6,122,403 A | 9/2000 | Rhoads |
| 6,141,753 A | 10/2000 | Zhao et al. |
| 6,229,924 B1 | 5/2001 | Rhoads et al. |
| 6,243,480 B1 | 6/2001 | Zhao et al. |
| 6,307,949 B1 | 10/2001 | Rhoads |
| 6,311,214 B1 | 10/2001 | Rhoads |
| 6,332,031 B1 | 12/2001 | Rhoads et al. |
| 6,381,341 B1 | 4/2002 | Rhoads |
| 6,385,329 B1 | 5/2002 | Sharma et al. |
| 6,408,082 B1 | 6/2002 | Rhoads et al. |
| 6,421,070 B1 | 7/2002 | Ramos et al. |
| 6,424,725 B1 | 7/2002 | Rhoads et al. |
| 6,427,020 B1 | 7/2002 | Rhoads |

(Continued)

FOREIGN PATENT DOCUMENTS

EP     0375138     6/1990

(Continued)

OTHER PUBLICATIONS

Matsutani et al,, "The Construction of Copyright-Protected Image Data", Technical Report of IEICE, ISEC94-58, Mar. 17, 1995, 20 pages.

(Continued)

*Primary Examiner* — Wesley Tucker

(57) ABSTRACT

An electronic system where messages include information carried by digital watermarks. The digital watermarks are used to control the transmission and/or receipt of messages including images or audio transmitted over the system. The system prevents the accidental dissemination of information to unauthorized receivers. Furthermore, while no security system is fool-proof, the system helps guards against the intentional, but unauthorized, dissemination of information to unauthorized receivers.

29 Claims, 4 Drawing Sheets

U.S. PATENT DOCUMENTS

| | | |
|---|---|---|
| 6,516,079 B1 | 2/2003 | Rhoads et al. |
| 6,522,770 B1 | 2/2003 | Seder et al. |
| 6,535,617 B1 | 3/2003 | Hannigan et al. |
| 6,542,927 B2 | 4/2003 | Rhoads |
| 6,553,129 B1 | 4/2003 | Rhoads |
| 6,567,533 B1 | 5/2003 | Rhoads |
| 6,580,808 B2 | 6/2003 | Rhoads |
| 6,590,996 B1 | 7/2003 | Reed et al. |
| 6,611,607 B1 | 8/2003 | Davis et al. |
| 6,614,914 B1 | 9/2003 | Rhoads et al. |
| 6,615,348 B1 | 9/2003 | Gibbs |
| 6,636,615 B1 | 10/2003 | Rhoads et al. |
| 6,647,128 B1 | 11/2003 | Rhoads |
| 6,647,130 B2 | 11/2003 | Rhoads |
| 6,650,761 B1 | 11/2003 | Rodriguez et al. |
| 6,681,028 B2 | 1/2004 | Rodriguez et al. |
| 6,681,029 B1 | 1/2004 | Rhoads |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,728,390 B2 | 4/2004 | Rhoads et al. |
| 6,744,906 B2 | 6/2004 | Rhoads et al. |
| 6,760,463 B2 | 7/2004 | Rhoads |
| 6,763,123 B2 | 7/2004 | Reed et al. |
| 6,768,809 B2 | 7/2004 | Rhoads et al. |
| 6,775,392 B1 | 8/2004 | Rhoads |
| 6,798,894 B2 | 9/2004 | Rhoads |
| 6,813,366 B1 | 11/2004 | Rhoads |
| 6,868,498 B1 | 3/2005 | Katsikas |
| 6,879,701 B1 | 4/2005 | Rhoads |
| 6,917,724 B2 | 7/2005 | Seder et al. |
| 6,920,232 B2 | 7/2005 | Rhoads |
| 6,922,480 B2 | 7/2005 | Rhoads |
| 6,947,571 B1 | 9/2005 | Rhoads et al. |
| 6,975,746 B2 | 12/2005 | Davis et al. |
| 6,988,202 B1 | 1/2006 | Rhoads et al. |
| 6,996,252 B2 | 2/2006 | Reed et al. |
| 7,000,186 B1 | 2/2006 | Gropper et al. |
| 7,003,731 B1 | 2/2006 | Rhoads et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Rhoads et al. |
| 7,051,086 B2 | 5/2006 | Rhoads et al. |
| 7,054,465 B2 | 5/2006 | Rhoads |
| 7,062,069 B2 | 6/2006 | Rhoads |
| 7,095,871 B2 | 8/2006 | Jones et al. |
| 7,111,170 B2 | 9/2006 | Rhoads et al. |
| 7,113,614 B2 | 9/2006 | Rhoads |
| 7,139,408 B2 | 11/2006 | Rhoads et al. |
| 7,158,654 B2 | 1/2007 | Rhoads |
| 7,164,780 B2 | 1/2007 | Brundage et al. |
| 7,171,016 B1 | 1/2007 | Rhoads |
| 7,171,020 B2 | 1/2007 | Rhoads et al. |
| 7,174,031 B2 | 2/2007 | Rhoads et al. |
| 7,177,443 B2 | 2/2007 | Rhoads |
| 7,213,757 B2 | 5/2007 | Jones et al. |
| 7,224,819 B2 | 5/2007 | Levy et al. |
| 7,248,717 B2 | 7/2007 | Rhoads |
| 7,261,612 B1 | 8/2007 | Hannigan et al. |
| 7,298,864 B2 | 11/2007 | Jones |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,369,678 B2 | 5/2008 | Rhoads |
| 7,377,421 B2 | 5/2008 | Rhoads |
| 7,391,880 B2 | 6/2008 | Reed et al. |
| 7,400,743 B2 | 7/2008 | Rhoads et al. |
| 7,406,214 B2 | 7/2008 | Rhoads et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,499,566 B2 | 3/2009 | Rhoads |
| 7,502,759 B2 | 3/2009 | Hannigan et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,545,952 B2 | 6/2009 | Brundage et al. |
| 7,564,992 B2 | 7/2009 | Rhoads |
| RE40,919 E | 9/2009 | Rhoads |
| 7,602,978 B2 | 10/2009 | Levy et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,756,892 B2 | 7/2010 | Levy |
| 7,760,905 B2 | 7/2010 | Rhoads et al. |
| 7,762,468 B2 | 7/2010 | Reed et al. |
| 7,787,653 B2 | 8/2010 | Rhoads |
| 7,792,325 B2 | 9/2010 | Rhoads et al. |
| 7,822,225 B2 | 10/2010 | Alattar |
| 7,837,094 B2 | 11/2010 | Rhoads |
| 2001/0005837 A1 | 6/2001 | Kojo |
| 2001/0018742 A1 | 8/2001 | Hirai |
| 2001/0026377 A1 | 10/2001 | Ikegami |
| 2001/0034705 A1 | 10/2001 | Rhoads et al. |
| 2001/0055407 A1 | 12/2001 | Rhoads |
| 2001/0056468 A1 | 12/2001 | Okayasu et al. |
| 2002/0009208 A1 | 1/2002 | Alattar et al. |
| 2002/0131076 A1 | 9/2002 | Davis |
| 2002/0176003 A1 | 11/2002 | Seder et al. |
| 2002/0186886 A1 | 12/2002 | Rhoads |
| 2002/0196272 A1 | 12/2002 | Ramos et al. |
| 2003/0023682 A1 | 1/2003 | Brown et al. |
| 2003/0040957 A1 | 2/2003 | Rhoads et al. |
| 2003/0105730 A1 | 6/2003 | Davis et al. |
| 2003/0130954 A1 | 7/2003 | Carr et al. |
| 2004/0005093 A1 | 1/2004 | Rhoads |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0251291 A1 | 11/2006 | Rhoads |
| 2007/0055884 A1 | 3/2007 | Rhoads |
| 2007/0108287 A1 | 5/2007 | Davis et al. |
| 2007/0154064 A1 | 7/2007 | Rhoads et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0116687 A1 | 5/2009 | Rhoads et al. |
| 2009/0125475 A1 | 5/2009 | Rhoads et al. |
| 2009/0129627 A1 | 5/2009 | Levy et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0027837 A1 | 2/2010 | Levy et al. |

| | | | |
|---|---|---|---|
| 2010/0045816 A1 | 2/2010 | Rhoads | |
| 2010/0054529 A1 | 3/2010 | Rhoads | |
| 2010/0062819 A1 | 3/2010 | Hannigan et al. | |
| 2010/0094639 A1 | 4/2010 | Rhoads | |
| 2010/0142749 A1 | 6/2010 | Ellingson et al. | |
| 2010/0172540 A1 | 7/2010 | Davis et al. | |
| 2010/0198941 A1 | 8/2010 | Rhoads | |
| 2010/0296526 A1 | 11/2010 | Rhoads | |
| 2011/0007936 A1 | 1/2011 | Rhoads | |

FOREIGN PATENT DOCUMENTS

| | | |
|---|---|---|
| EP | 1 063 833 | 12/2000 |
| EP | 1193925 | 4/2002 |
| JP | 2000-057327 | 2/2000 |
| JP | 2003-092605 | 3/2003 |
| WO | WO97/43736 | 11/1997 |
| WO | WO99/57623 | 11/1999 |
| WO | WO02/27617 | 4/2002 |

OTHER PUBLICATIONS

Garofalakis J et al: "Digital Robbery; Authors Are Not Unprotected", Computer Graphics International, 1998, pp. 558-563.
U.S. Appl. No. 08/635,531, filed Apr. 25, 1996, Geoffrey B. Rhoads.
U.S. Appl. No. 09/413,117, filed Oct. 6, 1999, Geoffrey B. Rhoads.
U.S. Appl. No. 09/507,096, filed Feb. 17, 2000, Geoffrey B. Rhoads et al.
U.S. Appl. No. 12/912,461, filed Oct. 26, 2010, Adnan M. Alattar.
U.S. Appl. No. 09/482,749, filed Jan. 13, 2000, Geoffrey B. Rhoads.
U.S. Appl. No. 09/234,780, filed Jan. 20, 1999, Geoffrey B. Rhoads.
U.S. Appl. No. 09/343,104, filed Jun. 29, 1999, Tony F. Rodriguez et al.
U.S. Appl. No. 09/697,009, filed Oct. 25, 2000, Bruce L. Davis et al.
U.S. Appl. No. 09/967,015, filed Oct. 25, 2000, Bruce L. Davis.
U.S. Appl. No. 09/633,587, filed Aug. 7, 2000, Geoffrey B. Rhoads et al.
U.S. Appl. No. 09/567,405, filed May 8, 2000, Geoffrey B. Rhoads et al.
U.S. Appl. No. 09/689,289, filed Oct. 11, 2000, Geoffrey B. Rhoads et al.
U.S. Appl. No. 09/629,649, filed Aug. 1, 2000, J. Scott Carr et al.
U.S. Appl. No. 09/552,998, filed Apr. 19, 2000, Tony F. Rodriguez et al.
U.S. Appl. No. 09/343,101, filed Jun. 29, 1999, Bruce L. Davis et al.
U.S. Appl. No. 12/953,190, filed Nov. 23, 2010, Geoffrey B. Rhoads.
U.S. Appl. No. 09/538,493, filed Mar. 30, 2000, Geoffrey B. Rhoads.

* cited by examiner

DIGITAL WATERMARKS AS A GATEWAY AND CONTROL MECHANISM

RELATED APPLICATION

This application is a continuation of U.S. patent application Ser. No. 09/784,391, filed Feb. 15, 2001 (now U.S. Pat. No. 7,298,864), which claims the benefit of U.S. Provisional Application No. 60/183,681, filed Feb. 19, 2000.

FIELD OF THE INVENTION

The invention relates to Internet communication and more particularly to using digital watermarks to as control elements in Internet communication.

BACKGROUND OF THE INVENTION

The Internet presents security challenges to corporations and others who have computers which store confidential information and which have connections to the internet. Traditionally, documents containing confidential information are marked with a legend or other visual indicia with words such a "CONFIDENTIAL", "PROPRIETARY", etc. The presence of these marks alerts anyone handling such documents that they should only be transferred outside of company under special precautions. It is relatively difficult and unusual for someone to inadvertently manually send such a document to an unauthorized receiver. However, the use of Internet communication changes the situation.

The Internet and electronic mail speeds the communications process; however, the Internet and electronic mail also make it much easier to inadvertently or accidentally send a confidential document to an unauthorized receiver. A single accidental or inadvertent keystroke can have wide ranging unintended consequences. The Internet and other electronic communication system make it easy to communicate; however, these systems and networks also make it easy to mistakenly or inadvertently sent a document to the wrong party.

SUMMARY OF THE PRESENT INVENTION

The invention utilizes digital watermarks to control the transmission and/or receipt of documents, including images or audio, transmitted over computer networks such as the Internet. The invention can be used to prevent the accidental dissemination of information to unauthorized receivers. Furthermore, while no security system is fool-proof, the invention helps guards against the intentional, but unauthorized, dissemination of information to unauthorized receivers.

Most electronically transmitted messages contain text. However, electronic mail systems generally allow images (i.e. pictures) or sound bites to be embedded into and form part of a message. For example, a message can contain a "stamp" with the word "confidential" or a message can contain a sound clip with the word "confidential". An image or sound clip that forms part of an electronic message can carry a digital watermark that can be detected and read by conventional watermark reading programs.

The "payload" or digital data in a digital watermark typically has a number of different fields. One or more of these fields can be dedicated to a flags which indicates that the document or image containing the watermark is confidential or otherwise classified and that it should only be disseminated in a particular manor.

Typically, e-mail enters a transmission network by way of an e-mail server. Programs that can detect and read watermarks are well known and commercially available. In one embodiment, the e-mail server passes each e-mail messages through a watermark detection and reading program prior to sending the message out over a network. If the watermark program detects a watermark, it interrogates certain flag bits to determine how the message should be handled. For example, if the watermark reading program finds that a particular flag is set, it can take action such as alerting both the sender and a network administrator. If the watermark program finds no watermark or finds that a particular flag is not set, the message is sent over the network in a conventional manner.

Thus, the invention can serve as a control mechanism for controlling the dissemination and receipt of electronic messages.

Messages and documents also enter the Internet and other electronic networks from servers such as Web servers and FTP servers. In a similar fashion a watermark detection program can interrogate documents on servers such as Web and FTP servers and take action as described above.

DESCRIPTION OF PREFERRED EMBODIMENTS

The embodiments of the invention described herein relate to systems for transmitting e-mail messages over the Internet. This first embodiment has the ability to prevent the accidental dissemination of confidential e-mail messages and documents to unauthorized users. That is, the first embodiment of the invention prevents the transmission of confidential e-mail or documents to anyone. An alternate embodiment merely prevents the transmission of confidential documents to "unauthorized" users. That is, if a message is sent to two recipients, one of whom is authorized and one of whom is not authorized, the documents are transmitted to authorized user and not transmitted to unauthorized user. It is very easy to add addressees to an e-mail message. Someone may address an e-mail message which contains confidential information to a large group of people without realizing the one of the addressee is not authorized to receive confidential information. The system will prevent such an e-mail from being transmitted to the unauthorized person even though the sender included the address of that person in the list of addressee. Another alternative embodiment can take a variety of actions such as logging messages or sending them to an administrator in addition to preventing them from being disseminated.

Figure 1:
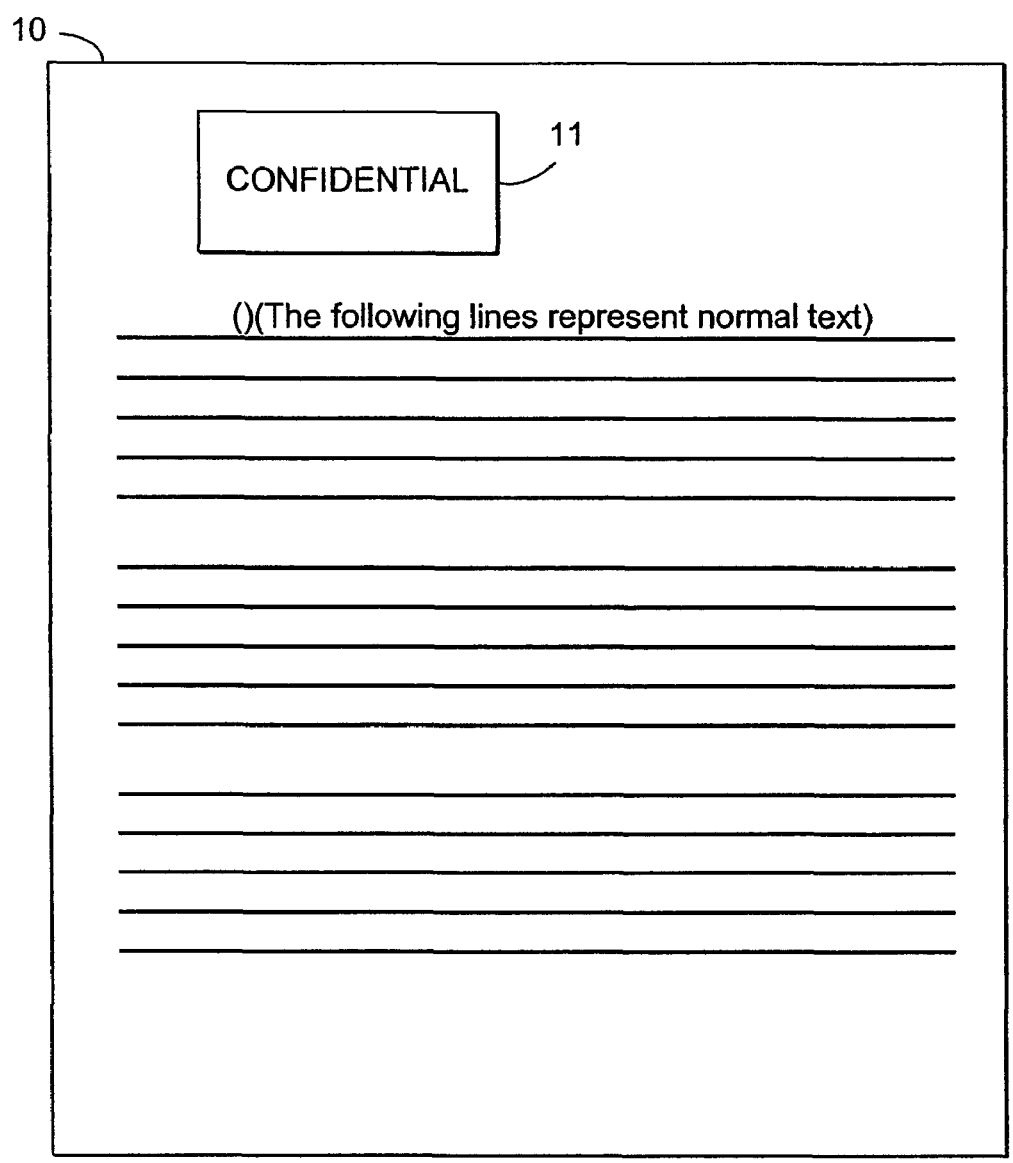
FIG. 1 is a diagram with an image containing the words "Confidential".

A typical confidential document 10 is represented in FIG. 1. The document 10 can either be an e-mail message, or alternatively it may be a document that is attached to an e-mail message. The document 10 includes a confidentiality stamp 11 and lines of text. The confidentiality stamp 11 is an image that has the word "confidential" superimposed over a background that has a variety of lines. That is, the background in image 11 contains lines the width of which are varied to carry a watermark in accordance with the teachings of U.S. application Ser. No. 09/074,034, filed May 6, 1998, now U.S. Pat. No. 6,449,377 (which corresponds to PCT application PCT/US99/08252), and U.S. application Ser. No. 09/127,503, filed Jul. 31, 1998 (which corresponding to PCT application PCT/US99/14532). The disclosures of the above referenced patent applications are hereby incorporated herein in their entireties by reference. Alternatively the background of image 11 may comprise a weave or tint pattern that carries a watermark. In still another alternative embodiment instead of having an image 11 embedded in the message, the message may contain an audio clip with the work confidential. The audio clip would be watermarked using conventional audio watermarking techniques. However, in the first embodiment described herein the, image 11 has both a human readable word "Confidential" and a digital watermark that can be read by a watermark detection and reading program.

Figure 2:
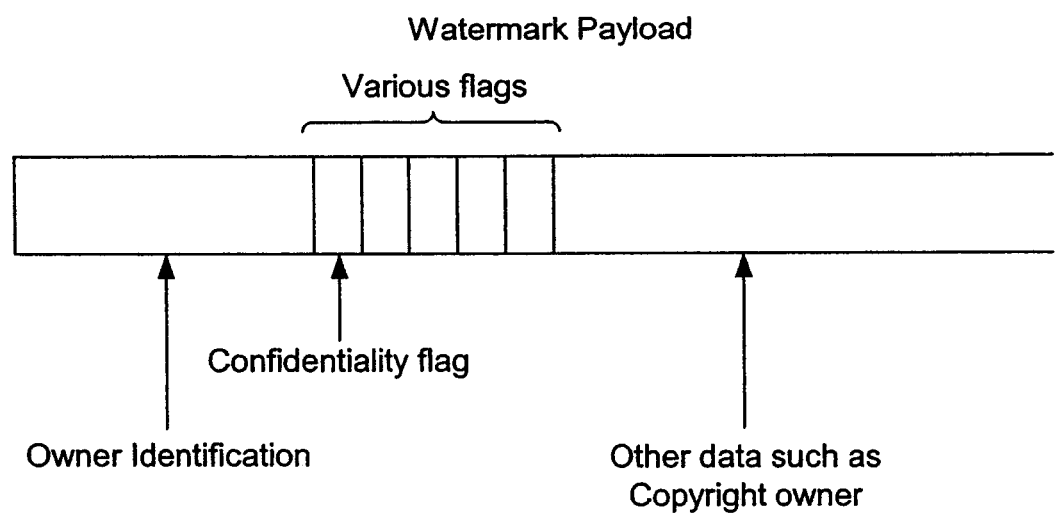
FIG. 2 is diagram of the fields in a typical watermark.

The data fields and flags in a typical watermark payload are shown in FIG. 2. It should be understood that the fields and flags shown are merely representative and they can take may alternative forms. The first embodiment of the invention utilizes one of the flag fields to indicate that a particular document is confidential. The other fields can be used in a conventional manner. Alternate embodiments can use a number of flags to indicate actions that should be taken with a particular message.

Figure 3:
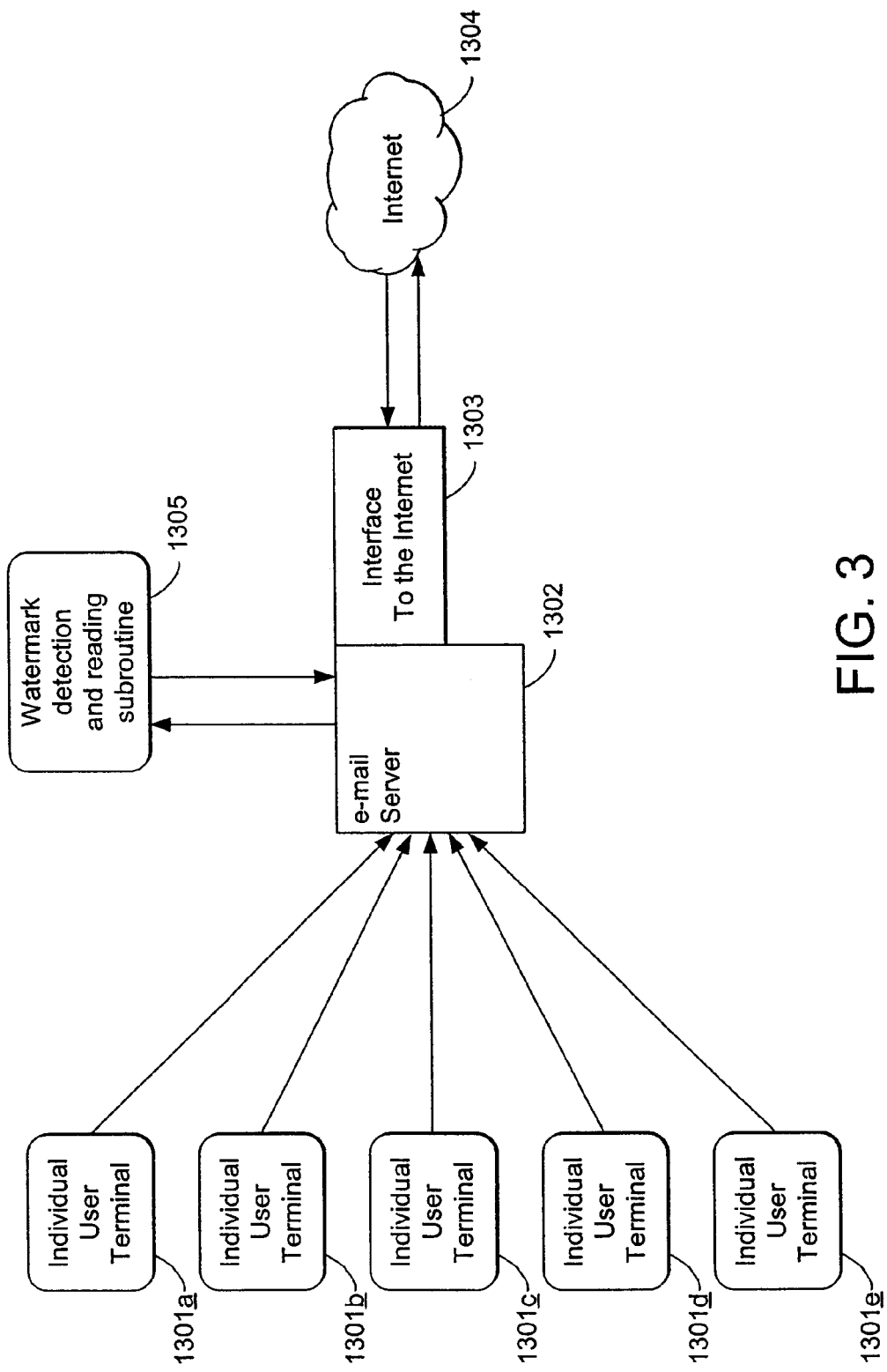
FIG. 3 is a diagram of a typical e-mail system.

FIG. 3 shows a typical e-mail system. A relatively large number of individual user terminal 301 are connected to an e-mail server 302. Only five representative terminals designated 301a to 301x are shown for convenience of illustration. The terminals 301 are connected to server 302 by conventional connections such as by an Ethernet LAN or by dial up modems. The e-mail server 302 has a conventional interface 303 to the Internet and it receives and sends messages from the individual users to the Internet. The e-mail server 302 is conventional and the details of the e-mail server 302 form no part of the present invention. However, with the present invention, before the e-mail server 302 transmits a message from one of the individual user terminals 301a to 301x to the Internet, the e-mail server passes the message through a watermark detection and reading program 305. Both the e-mail message itself and any attached documents are passed through the watermark reading program. The watermark detection and reading program 305 determines if a message contains a watermark. If a watermark is detected, the confidentiality flag bit is interrogated. If the watermark reading program 305 determines that the flag bit is set to "confidential", the first embodiment of the invention merely informs the e-mail server 302 to return the message to the sender. Thus, the first embodiment of the invention prohibits any confidential information from being transmitted as part of an e-mail message.

Figure 4:
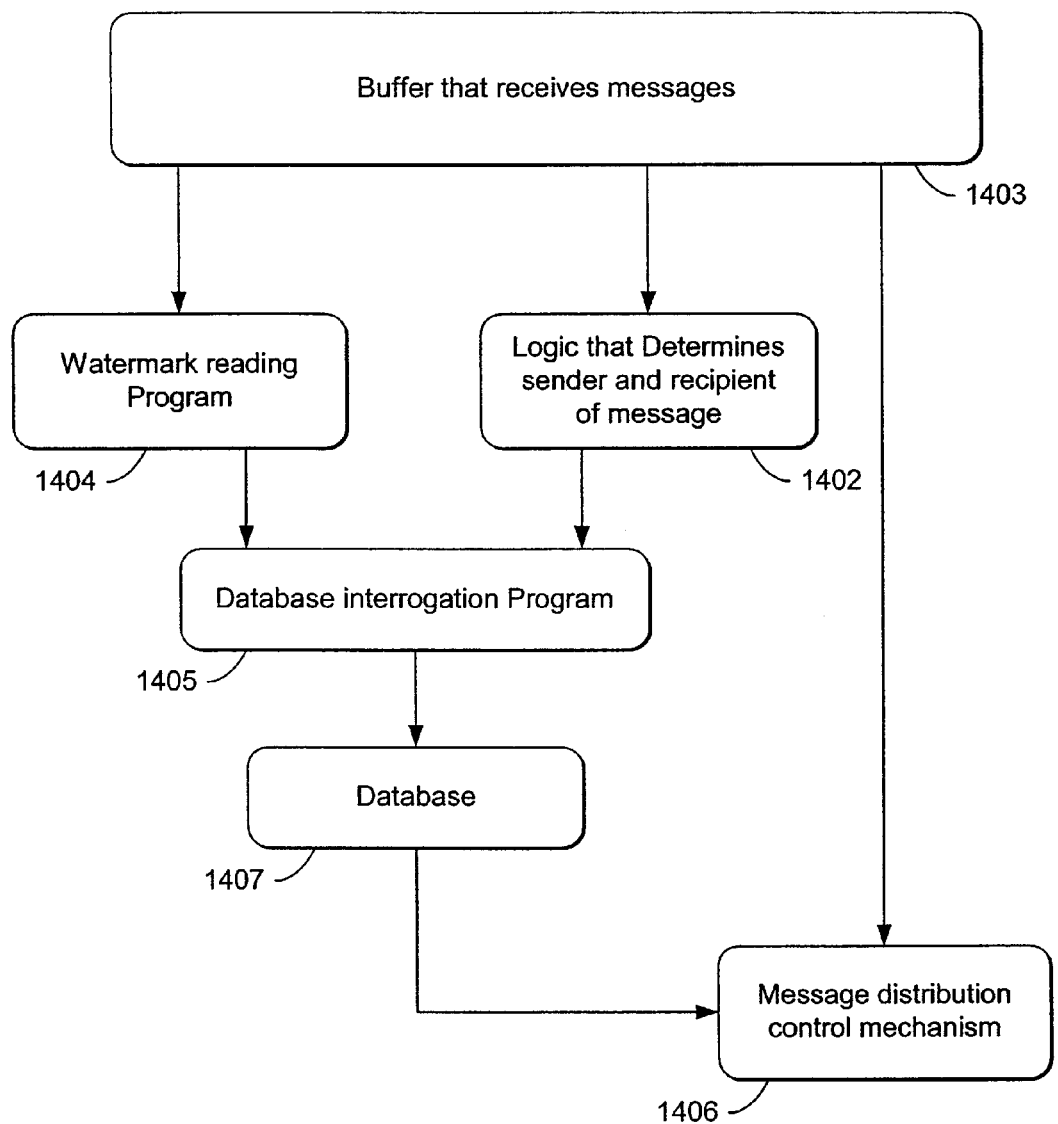
FIG. 4 is a more detailed diagram of the watermark reading and detection program shown in FIG. 3.

A second embodiment of the invention provides for a wider array of alternative. As shown in FIG. 4, the second embodiment of the invention includes a data base 401. The data base 401 contains a list of different potential message senders, a list showing different groups of potential message recipients, and a set of possible categories indicated by the setting of the various flags in a message. For example, the senders may fall into three groups designated sender groups S1, S2 and S3. The potential recipients can fall into three groups designated R1, R2, and R3. The data base 401 and the associated logic 402 can implement logic rules such as indicated by the following table:

| Sender Group | Recipient Group | Flag Conditions | Action |
|---|---|---|---|
| S1 | R1 | 011 | Send message |
| S1 | R2 | 110 | Do not sent message notify the administrator |
| S1 | R2 | 001 | Send message, and log fact that S1 sent a message to R2. |
| S1 | R2 | 101 | Return message to sender |
| S2 | R1 | 011 | Send message |
| S2 | R3 | 110 | Do not sent message and notify the system administrator |

It should be clearly noted that the above is merely a simplified example of the rules and combinations that could be in data base 401. The data bases could include hundreds or thousands of users and it could include dozens of rules. The system can be complex or simple as desired for a particular application. A system can include many alternatives in addition to those shown above or a system might include only a very few alternatives. For example, the system could include only a list of addresses which are authorized to receive messages which have a confidentiality flag set to "confidential". Such a system would allow confidential documents to be only sent to selected addresses. Alternatively or in addition the system could include a list of individuals authorized to send confidential documents. The system could merely check the sender against this list or alternatively, the system could require that a password be entered when such messages are encountered. The table above shows three flag bits. A system could have more or less flag bits as the needs of the particular system require.

The import point is that the system considers the message sender, the message recipient and the condition of the flags in the data carried by a digital watermark to determine what action should be taken. The digital watermark can be carried by the message using any of the known ways of watermarking a document. For example, it can be carried by modulating the width of lines or by modulating the luminosity of pixels in an image or by a watermark in audio data.

In alternate embodiments of the invention, the confidentiality stamp could include a watermark in an image by means other than using line width modulation as described with respect to the first embodiment of the invention. The background of the stamp could include a conventional image carrying a conventional watermark.

In an alternative embodiment of the invention, rather than checking for a digital watermark, the system could check for a text string such as "confidential" and take action in response to locating such a text string.

The above described embodiments relate to controlling the dissemination of information; however, it should be understood that the invention could be applied in similar manner to control the receipt of confidential information or to control the action taken when messages containing watermarks are received.

While the previously described embodiments apply to e-mail systems, similar precautions could be taken with FTP servers or with Web servers.

While the invention has been shown and described with respect to various preferred embodiments, it should be understood that various changes in form and detail could be made without departing from the scope and spirit of the invention.

I claim:

1. A method comprising:
receiving a message, at a server, being transmitted on a transmission network from a sender to a receiver;

extracting audio or image data from the message;
detecting a digital watermark in the audio or image data;
reading one or more bits of data carried in the digital watermark; and
taking an action, in response to reading the one or more bits, to manage the transfer of the message, including logging information about the message.

2. The method of claim 1, wherein the audio or image data comprises a sound clip.

3. The method of claim 1, further comprising controlling transmission of the message as a function of the one or more bits and identity of the sender or the receiver.

4. The method of claim 1, wherein the action is determined by interrogating a database with information about the sender or the receiver and information from the digital watermark.

5. The method of claim 1, wherein the server comprises a web server, and wherein the web server extracts the audio or image data from the message and executes a watermark reader to detect the digital watermark and read the one or more bits of data carried in the digital watermark.

6. The method of claim 1, wherein the server comprises an electronic file transfer server, and wherein the electronic file transfer server extracts the audio or image data from the message and executes a watermark reader to detect the digital watermark and read the one or more bits of data carried in the digital watermark.

7. The method of claim 1, wherein receivers of messages transmitted on the transmission network are categorized into different groups, and wherein the action depends on a determination of which of these groups the receiver is associated with.

8. The method of claim 1, wherein senders of messages transmitted on the transmission network are categorized into different groups, and wherein the action depends on a determination of which of these groups the sender of the message is associated with.

9. The method of claim 1, wherein the action comprises sending an alert to the sender.

10. The method of claim 1, wherein the action comprises sending an alert to an administrator, wherein the administrator is separate from the sender and receiver of the message.

11. The method of claim 1, wherein the one or more bits comprise one or more predetermined flags.

12. The method of claim 1, wherein the action comprises seeking additional authorization, electronically from the sender or the receiver of the message.

13. The method of claim 12, wherein the additional authorization comprises a password.

14. The method of claim 1, wherein the action comprises interrogating a rules database, wherein the rules database provides the action to be taken based on the one or more bits and information about the sender or the receiver.

15. A system comprising:
a server on a transmission network configured to receive and route, a message being transmitted on the transmission network from a sender to a receiver, wherein the server includes memory for storing at least part of the message, wherein the server further includes an interface configured to extract audio or image data from the at least part of the message stored in the memory; and
a digital watermark detector, in communication with the interface, configured to detect a digital watermark in the audio or image data, and further configured to read one or more bits of data carried in the digital watermark;
wherein the server is further configured to take an action, in response to the one or more bits, to manage the transfer of the message, including logging information about the message.

16. The system of claim 15, wherein the server comprises a gateway between a sending device of the sender and a network.

17. The system of claim 15, wherein the interface is configured to extract the audio or image data from the message while the message is temporarily buffered for transfer over a network.

18. The system of claim 15, wherein the audio or image data comprises a sound clip.

19. The system of claim 15, wherein the server is further configured to control transmission of the message as a function of the one or more bits and identity of the sender or the receiver.

20. The system of claim 15, wherein the server is further configured to interrogate a rules database with information about the sender or the receiver and information from the digital watermark to determine the action.

21. The system of claim 15, wherein the server comprises a web server, and wherein the web is configured to:
extract the audio or image data from the message; and
execute a watermark reader, wherein the watermark reader is configured to to detect the digital watermark and read the one or more bits of data carried in the digital watermark.

22. The system of claim 15, wherein the server comprises an electronic file transfer server, and wherein the electronic file transfer server is configured to:
extract the audio or image data from the message; and
execute a watermark reader, wherein the watermark reader is configured to detect the digital watermark and read the one or more bits of data carried in the digital watermark.

23. The system of claim 15, wherein receivers of messages transmitted on the transmission network are categorized into different groups, and wherein the action depends on a determination of which of these groups the receiver is associated with.

24. The system of claim 15, wherein senders of messages transmitted on the transmission network are categorized into different groups, and wherein the action depends on a determination of which of these groups the sender of the message is associated with.

25. The system of claim 15, wherein the action comprises sending an alert to the sender or an administrator regarding control of the transfer of the message.

26. An apparatus comprising:
a processor; and
a computer-readable medium operatively connected to the processor having instructions stored thereon that, if executed by the processor, cause the apparatus to:
receive a message being transmitted on the transmission network from a sender to a receiver;
extract audio or image data from the message;
detect a digital watermark in the audio or image data;
read one or more bits of data carried in the digital watermark; and
in response to reading the one or more bits, take an action to manage the transfer of the message, including logging information about the message.

27. The apparatus of claim 26, wherein the computer-readable medium further comprises instructions that, if executed by the processor, cause the apparatus to interrogate a rules database with information about the sender or the receiver and information from the digital watermark to determine the action.

28. An article of manufacture including a computer-readable medium having instructions stored thereon that, if executed by a computing device, cause the computing device to perform operations comprising:

receiving a message being transmitted on the transmission network from a sender to a receiver;

extracting audio or image data from the message;

detecting a digital watermark in the audio or image data;

reading one or more bits of data carried in the watermark; and in response to reading the one or more bits, taking an action to manage the transfer of the message, including logging information about the message.

29. The article of manufacture of claim 28, wherein the action comprises sending an alert to the sender or an administrator regarding control of the transfer of the message.

* * * * *

UNITED STATES PATENT AND TRADEMARK OFFICE
CERTIFICATE OF CORRECTION

| | | |
|---|---|---|
| PATENT NO. | : 7,965,863 B2 | Page 1 of 1 |
| APPLICATION NO. | : 11/943361 | |
| DATED | : June 21, 2011 | |
| INVENTOR(S) | : Jones | |

It is certified that error appears in the above-identified patent and that said Letters Patent is hereby corrected as shown below:

Title page, item (56), under "Other Publications", in Column 2, Line 1, delete "et al,," and insert -- et al., --.

Column 5, line 47, in Claim 12, delete "electronically" and insert -- electronically, --.

Column 6, line 24, in Claim 21, delete "web is" and insert -- web server is --.

Column 6, line 27, in Claim 21, delete "to to" and insert -- to --.

Signed and Sealed this
Sixth Day of December, 2011

David J. Kappos
*Director of the United States Patent and Trademark Office*